US007674168B2

(12) United States Patent
Gerrard et al.

(10) Patent No.: US 7,674,168 B2

(45) Date of Patent: Mar. 9, 2010

(54) GAMING DEVICE HAVING A RANDOMLY SELECTED SYMBOL ELIMINATION GAME

(75) Inventors: Peter Gerrard, Prestwich (GB); Dov L. Randall, Whitefield (GB)

(73) Assignee: IGT, Reno, NV (US)

(*) Notice: Subject to any disclaimer, the term of this patent is extended or adjusted under 35 U.S.C. 154(b) by 1064 days.

(21) Appl. No.: 10/236,660

(22) Filed: Sep. 6, 2002

(65) Prior Publication Data

US 2004/0053669 A1 Mar. 18, 2004

(51) Int. Cl.

*A63F 13/02* (2006.01)
*A63F 13/10* (2006.01)
*G07F 17/34* (2006.01)
*A63F 5/04* (2006.01)

(52) U.S. Cl. ........................................ 463/16; 463/20

(58) Field of Classification Search .................... 463/9, 463/10, 31, 37, 41, 42, 11–13, 16–22, 25–27

See application file for complete search history.

(56) References Cited

U.S. PATENT DOCUMENTS

| | | | | |
|---|---|---|---|---|
| 1,506,426 | A * | 8/1924 | Hoke | 400/486 |
| 3,834,712 | A * | 9/1974 | Cox | 273/143 R |
| 4,448,419 | A | 5/1984 | Telnaes | |
| 4,624,459 | A | 11/1986 | Kaufman | |
| 4,695,053 | A | 9/1987 | Vazquez, Jr. et al. | |
| 5,031,914 | A * | 7/1991 | Rosenthal | 463/22 |
| 5,342,047 | A | 8/1994 | Heidel et al. | |
| 5,456,465 | A | 10/1995 | Durham | |
| 5,524,888 | A | 6/1996 | Heidel | |
| 5,542,669 | A | 8/1996 | Charron et al. | |
| 5,647,798 | A * | 7/1997 | Falciglia | 463/19 |
| 5,775,692 | A | 7/1998 | Watts et al. | |
| 5,931,467 | A | 8/1999 | Kamille | |
| 5,935,002 | A * | 8/1999 | Falciglia | 463/19 |

(Continued)

FOREIGN PATENT DOCUMENTS

EP 0945837 A2 3/1999

(Continued)

OTHER PUBLICATIONS

Manual for Sega CD "Wheel of Fortune" game, downloaded from www.replacementdocs.com, Mar. 11, 2008.*

(Continued)

*Primary Examiner*—Peter DungBa Vo
*Assistant Examiner*—Matthew D. Hoel
(74) *Attorney, Agent, or Firm*—K&L Gates LLP

(57) ABSTRACT

A gaming device including a game which displays a plurality of symbols to a player. A probability of being selected by the processor is associated with each of the symbols. Additionally, at least two picks of the symbols are provided to the player where the number of picks is less than the number of symbols. In a game, the processor randomly picks the symbols for the number of picks provided to the player. The player receives any awards associated with the symbols picked by the processor. The processor then eliminates the picked symbols from further selection in the game. Eliminating the picked symbols increases the probabilities associated with the unpicked symbols for future picks based on the probabilities associated with the picked symbols. The player continues to pick selections until there are no picks remaining in the game.

93 Claims, 18 Drawing Sheets

U.S. PATENT DOCUMENTS

| | | | | |
|---|---|---|---|---|
| 5,951,397 | A | 9/1999 | Dickinson | |
| 5,967,894 | A | 10/1999 | Kinoshita et al. | |
| 6,059,289 | A | 5/2000 | Vancura | |
| 6,062,980 | A | 5/2000 | Luciano | |
| 6,079,711 | A * | 6/2000 | Wei et al. | 273/269 |
| 6,102,798 | A | 8/2000 | Bennett | |
| 6,117,009 | A * | 9/2000 | Yoseloff | 463/20 |
| 6,126,542 | A * | 10/2000 | Fier | 463/16 |
| 6,142,875 | A | 11/2000 | Kodachi | |
| 6,155,925 | A | 12/2000 | Giobbi et al. | |
| 6,159,095 | A | 12/2000 | Frohm et al. | |
| 6,159,096 | A * | 12/2000 | Yoseloff | 463/20 |
| 6,159,097 | A | 12/2000 | Gura | |
| 6,159,098 | A | 12/2000 | Slomiany et al. | |
| 6,168,520 | B1 * | 1/2001 | Baerlocher et al. | 463/16 |
| 6,174,233 | B1 | 1/2001 | Sunaga et al. | |
| 6,174,235 | B1 | 1/2001 | Walker | |
| 6,203,429 | B1 | 3/2001 | Demar et al. | |
| 6,210,279 | B1 | 4/2001 | Dickinson | |
| 6,224,483 | B1 | 5/2001 | Mayeroff | |
| 6,231,442 | B1 * | 5/2001 | Mayeroff | 463/20 |
| 6,231,445 | B1 | 5/2001 | Acres | |
| 6,234,897 | B1 | 5/2001 | Frohm et al. | |
| 6,238,287 | B1 | 5/2001 | Komori et al. | |
| 6,261,177 | B1 * | 7/2001 | Bennett | 463/16 |
| 6,280,325 | B1 * | 8/2001 | Fisk | 463/19 |
| 6,309,300 | B1 | 10/2001 | Glavich | |
| 6,315,664 | B1 | 11/2001 | Baerlocher et al. | |
| 6,346,043 | B1 | 2/2002 | Colin et al. | |
| 6,375,187 | B1 | 4/2002 | Baerlocher | |
| 6,394,902 | B1 | 5/2002 | Glavich et al. | |
| 6,398,218 | B1 | 6/2002 | Vancura | |
| 6,413,160 | B1 | 7/2002 | Vancura | |
| 6,413,161 | B1 | 7/2002 | Baerlocher et al. | |
| 6,413,162 | B1 | 7/2002 | Baerlocher et al. | |
| 6,439,995 | B1 * | 8/2002 | Hughs-Baird et al. | 463/20 |
| 6,491,584 | B2 | 12/2002 | Graham et al. | |
| 6,514,141 | B1 | 2/2003 | Kaminkow et al. | |
| 6,547,242 | B1 | 4/2003 | Sugiyama et al. | |
| 6,607,438 | B2 | 8/2003 | Baerlocher et al. | |
| 2002/0111207 | A1 * | 8/2002 | Lind et al. | 463/19 |
| 2002/0151353 | A1 * | 10/2002 | Gauselmann | 463/25 |

FOREIGN PATENT DOCUMENTS

| | | | |
|---|---|---|---|
| EP | 0 945 837 | A2 * | 9/1999 |

OTHER PUBLICATIONS

IGT review of Sega CD "Wheel of Fortune" game, establishing release date of Oct. 6, 2004, downloaded from http://cheats.ign.com/objects/007/007803.html, Mar. 11, 2008.*

"The Encyclopedia of TV Game Shows," third edition, by Schartz, et al., 1999, Checkmark Books, New York, N.Y., pp. 250-252 on "Wheel of Fortune."*

"Jackpot Party Brochures and Articles", written by WMS Gaming Inc., published in 1998 and 2001.

"Pink Panther", written by IGT, published in 2000.

"Lifestyles of the Rich and Famous", written by IGT, published in 2003.

* cited by examiner

FIG. 3B

112

| AWARD (114) | PROBABILITY OF PICKING THE AWARD (116) |
|---|---|
| 5 | 5% (5/100) |
| 10 | 5% (5/100) |
| 20 | 15% (15/100) |
| 25 | 20% (20/100) |
| 30 | 20% (20/100) |
| 35 | 10% (10/100) |
| 50 | 10% (10/100) |
| 60 | 5% (5/100) |
| 80 | 4% (4/100) |
| 100 | 3% (3/100) |
| 250 | 2% (2/100) |
| 1000 | 1% (1/100) |

FIG. 3C

112

| AWARD (114) | PROBABILITY OF PICKING THE AWARD (116) |
|---|---|
| 5 | 8.33% (5/60) |
| 10 | 8.33% (5/60) |
| 20 | 25.00% (15/60) |
| ~~25~~ | — |
| ~~30~~ | — |
| 35 | 16.67% (10/60) |
| 50 | 16.67% (10/60) |
| 60 | 8.33% (5/60) |
| 80 | 6.67% (4/60) |
| 100 | 5.00% (3/60) |
| 250 | 3.33% (2/60) |
| 1000 | 1.67% (1/60) |

FIG. 4B

112

| AWARD (114) | PROBABILITY OF PICKING THE AWARD (116) |
|---|---|
| 5 | 5% (5/100) |
| 10 | 10% (10/100) |
| 20 | 20% (20/100) |
| 25 | 25% (25/100) |
| 30 | 15% (15/100) |
| 35 | 5% (5/100) |
| 50 | 5% (5/100) |
| 60 | 5% (5/100) |
| 80 | 4% (4/100) |
| 100 | 3% (3/100) |
| 250 | 2% (2/100) |
| 1000 | 1% (1/100) |

FIG. 4D

112

114 116

| AWARD | PROBABILITY OF PICKING THE AWARD |
|---|---|
| 5 | 7.14% (5/70) |
| ~~10~~ | — |
| ~~20~~ | — |
| 25 | 35.71% (25/70) |
| 30 | 21.43% (15/70) |
| 35 | 7.14% (5/70) |
| 50 | 7.14% (5/70) |
| 60 | 7.14% (5/70) |
| 80 | 5.71% (4/70) |
| 100 | 4.29% (3/70) |
| 250 | 2.86% (2/70) |
| 1000 | 1.43% (1/70) |

FIG. 4F

112

| AWARD (114) | PROBABILITY OF PICKING THE AWARD (116) |
|---|---|
| ~~5~~ | — |
| ~~10~~ | — |
| ~~20~~ | — |
| ~~25~~ | — |
| ~~30~~ | — |
| 35 | 20.00% (5/25) |
| 50 | 20.00% (5/25) |
| 60 | 20.00% (5/25) |
| 80 | 16.00% (4/25) |
| 100 | 12.00% (3/25) |
| 250 | 8.00% (2/25) |
| 1000 | 4.00% (1/25) |

FIG. 4H

112

114 116

| AWARD | PROBABILITY OF PICKING THE AWARD |
|---|---|
| ~~5~~ | — |
| ~~10~~ | — |
| ~~20~~ | — |
| ~~25~~ | — |
| ~~30~~ | — |
| ~~35~~ | — |
| ~~50~~ | — |
| 60 | 33.33% (5/15) |
| 80 | 26.67% (4/15) |
| 100 | 20.00% (3/15) |
| 250 | 13.33% (2/15) |
| 1000 | 6.67% (1/15) |

FIG. 5B

210

212 214

| AWARD | PROBABILITY OF PICKING THE AWARD |
|---|---|
| 5 | 5% (5/100) |
| 10 | 5% (5/100) |
| 20 | 10% (10/100) |
| 25 | 15% (15/100) |
| 30 | 20% (20/100) |
| X (204) | 20% (20/100) |
| 50 | 10% (10/100) |
| 60 | 5% (5/100) |
| 80 | 4% (4/100) |
| 100 | 3% (3/100) |
| 250 | 2% (2/100) |
| 1000 | 1% (1/100) |

GAMING DEVICE HAVING A RANDOMLY SELECTED SYMBOL ELIMINATION GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Bonus games typically include a plurality of awards ranging from relatively small awards to relatively large awards such as a jackpot award. These awards are generally weighted so that the relatively large awards are more difficult to obtain than the relatively small awards in a bonus game. Thus, players are less likely to obtain the relatively large awards such as the jackpot award in the game.

Accordingly, gaming devices that employ bonus games that increase the probability of obtaining the relatively large award or awards are desirable. Players are attracted to games that provide larger awards and games that increase the chances of obtaining the larger awards. Therefore, to increase player enjoyment and excitement, it is desirable to provide new games for gaming devices.

SUMMARY OF THE INVENTION

The present invention provides a gaming device and in particular a game of a gaming device that randomly selects awards, eliminates the selected symbols such as award symbols or awards from further selection in the game and increases the probability of the player subsequently obtaining the non-selected symbols, award symbols or awards in the game.

In one embodiment, the gaming device includes a plurality of symbols displayed to a player by a display device. A probability of being picked by the processor is associated with each of the symbols. Also, a plurality of awards are associated with the symbols where the awards may be any award such as credits, monetary or other values, prizes, free spins, free games, multipliers or any other suitable award. The processor provides at least two picks in the game where the number of provided picks is less than the number of symbols in the game. Then, the processor randomly picks symbols from the plurality of symbols based on the probabilities associated with those symbols. Each symbol picked in the game, including the probability associated with that symbol, is eliminated from further selection in the game. As a result, the probabilities associated with the unpicked symbols proportionately increase based on the probabilities associated with the picked symbols. This occurs because the proportionate shares of the total probability (i.e., the sum of the probabilities associated with each of the symbols) associated with each of the symbols increases as the total probability decreases. In one embodiment, the probabilities associated with the unpicked symbols proportionately increase after each pick of the symbols. In another embodiment, the probabilities associated with the unpicked symbols proportionately increase after a plurality of picks of the symbols. The processor continues to pick symbols until there are no picks remaining in the game. The number of picks may be determined in any suitable manner such as being predetermined, randomly determined by the processor, or randomly determined by a player. The number of picks can accordingly be determined in a separate game or sub-game, based on an amount of wager or otherwise.

In one embodiment, the gaming device displays a plurality of selections to the player on a display device where each selection includes a total number of picks of the symbols in a game. The gaming device enables the player to pick one of the selections and randomly picks the symbols for a number of picks equal to the total number of picks associated with the picked selection in the game. In one aspect of this embodiment, the display device includes a touch screen and the gaming device enables the player to physically touch or press one of the selections to pick the selection in the game.

In one embodiment, the number of picks is determined in a game or subgame which includes a plurality of selections displayed by the display device where each of the selections includes at least one pick of the symbols or a terminator symbol. In a play of the game, the player picks one of the selections to reveal a number of picks of the symbols. A processor of the gaming device then randomly picks a number of symbols based on the probabilities associated with the symbols, where the number of picked symbols equals the number of picks associated with the picked selection. The awards associated with the symbols picked by the processor are added to the players total award in the game. In addition, the picked awards are eliminated from further selection in the game and may not be picked again in that game. By eliminating the picked awards from further selection in the game, the probability of picking each of the remaining symbols proportionately increases as described above. This facilitates a better chance for a player to receive the more valuable awards which initially have lower probabilities than less valuable awards.

The player continues to pick selections and receive picks of the symbols until the player picks the selection including the terminator symbol. When the player picks the selection including the terminator symbol, the game ends and the player receives the total award for the game. In another embodiment, the gaming device resets the selections after the player picks one of the selections in a game. Therefore, the gaming device displays a new set of selections or resets the selections prior to each pick of the selections by the player in the game.

In a further embodiment, the number of picks is randomly determined by a wheel displayed in the game. The wheel includes several sections where each of the sections includes at least one pick or a terminator symbol. The processor activates or spins the wheel and a section indicator indicates one of the sections on the wheel. The processor then provides the number of picks associated with the indicated section on the wheel to the player. Thus, it should be appreciated that the number of picks provided to a player in a game may be randomly determined, predetermined, based on the player's wager in the game or determined according to any suitable determination method.

In one embodiment, the award symbols include at least one relatively large award and a plurality of relatively small awards. In this embodiment, the probability associated with the symbol including the relatively large award is less than the probabilities associated with the symbols including the relatively small awards. In another aspect of this embodiment, the probability associated with the symbol including the relatively large award is less than a plurality of the probabilities associated with the symbols including the relatively small awards. In a further aspect of this embodiment, the probability associated with the symbol including the relatively large award is less than all of the probabilities associated with the symbols including the relatively small awards. In one embodiment, the relatively large award is a jackpot award. Although the symbol including the relatively large award generally has a lower probability than the probabilities associated with symbols including the relatively small awards, the probability of obtaining the large award proportionately increases as the player progresses in the game. Therefore, the probability that a player will obtain the relatively large award or jackpot award in a game increases as more awards are picked and eliminated from further selection in the game (assuming that the large award is not selected). This increases the level of excitement and enjoyment to the player.

In another embodiment, the plurality of symbols includes one or more terminator symbols. A probability of being selected by the processor is associated with each of the terminator symbols in a game as well as the symbols in the game. As a player progresses in the game, the probability of picking the terminator symbol proportionately increases because the picked symbols are eliminated from the game. In one aspect of this embodiment, the probability associated with the terminator symbol is greater than the probabilities associated with at least one of the symbols. In another aspect of this embodiment, the probability associated with the terminator symbol is greater than the probabilities associated with a plurality of the symbols. Associating one or more terminator symbols with the symbols, increases the chance of terminating the game versus achieving the larger awards in the game and provides additional excitement and enjoyment to the players.

In a further embodiment, the symbols are formed with different shapes or configurations. The shapes or configurations may be any suitable shapes or configurations and may be based on the theme of the game.

In an alternative embodiment, the selections include a number of picks of the symbols and at least one terminator. The player picks the selections based on the probabilities of being picked by the processor associated with the selections and receives a number of picks of the symbols for each picked selection. The gaming device provides an award or awards associated with each picked symbols. If the player picks a selection including a terminator, the gaming device ends the game and decreases the player's total award. In one embodiment, the gaming device decreases the total award by a predetermined amount such as decreasing the total award by 50% or by half. The gaming device then provides the decreased total award to the player. It should be appreciated that the gaming device may decrease the total award by a predetermined amount, a randomly determined amount or by any other suitable amount. In another embodiment, the gaming device provides a consolation award, which is less than the player's total award in the game. Thus, the player may accept the total award at any point in the game or risk all or a portion of the total award and continue picking selections in the game based on the probabilities associated with the unpicked symbols. The player attempts to increase their total award in the game while risking all or a portion of the total award with each pick of the selections.

Although the present invention is described with respect to a bonus game, it should be appreciated that the present invention may be employed as a primary game, or bonus game or any other suitable type of game in a gaming device.

It is therefore an advantage of the present invention to provide a gaming device which proportionately increases the probabilities of picking awards in a game.

Another advantage of the present invention is to provide a gaming device that increases the probability of obtaining the relatively large awards in a game.

A further advantage of the present invention is to provide a gaming device that increases the probability of obtaining the jackpot award in the game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3B is a probability table of one embodiment of the present invention illustrating the probabilities associated with the awards shown in FIG. 3A.

FIG. 3C is another probability table of one embodiment of the present invention illustrating the proportionate increase of the probabilities associated with the remaining awards shown in FIG. 3A after the awards of twenty-five and thirty are picked and eliminated from further selection in the game.

FIG. 4B is a probability table associated with the award symbols of the embodiment shown in FIG. 4A.

FIG. 4D is a probability table associated with the symbols of FIG. 4C where the picked symbols are eliminated and the probabilities associated with the remaining symbols are increased proportionately.

FIG. 4F is a probability table associated with the embodiment of FIG. 4E where the probability table illustrates the proportionate increase of the probabilities associated with the remaining symbols in the game.

FIG. 4H is the probability table associated with the embodiment of FIG. 4G where the probability table illustrates the proportionate increase of the probabilities associated with the remaining symbols in the game.

FIG. 5B is a probability table illustrating the probabilities associated with the symbols shown in the embodiment of FIG. 5A.

DETAILED DESCRIPTION OF THE INVENTION

Gaming Device and Electronics

Figure 1A:
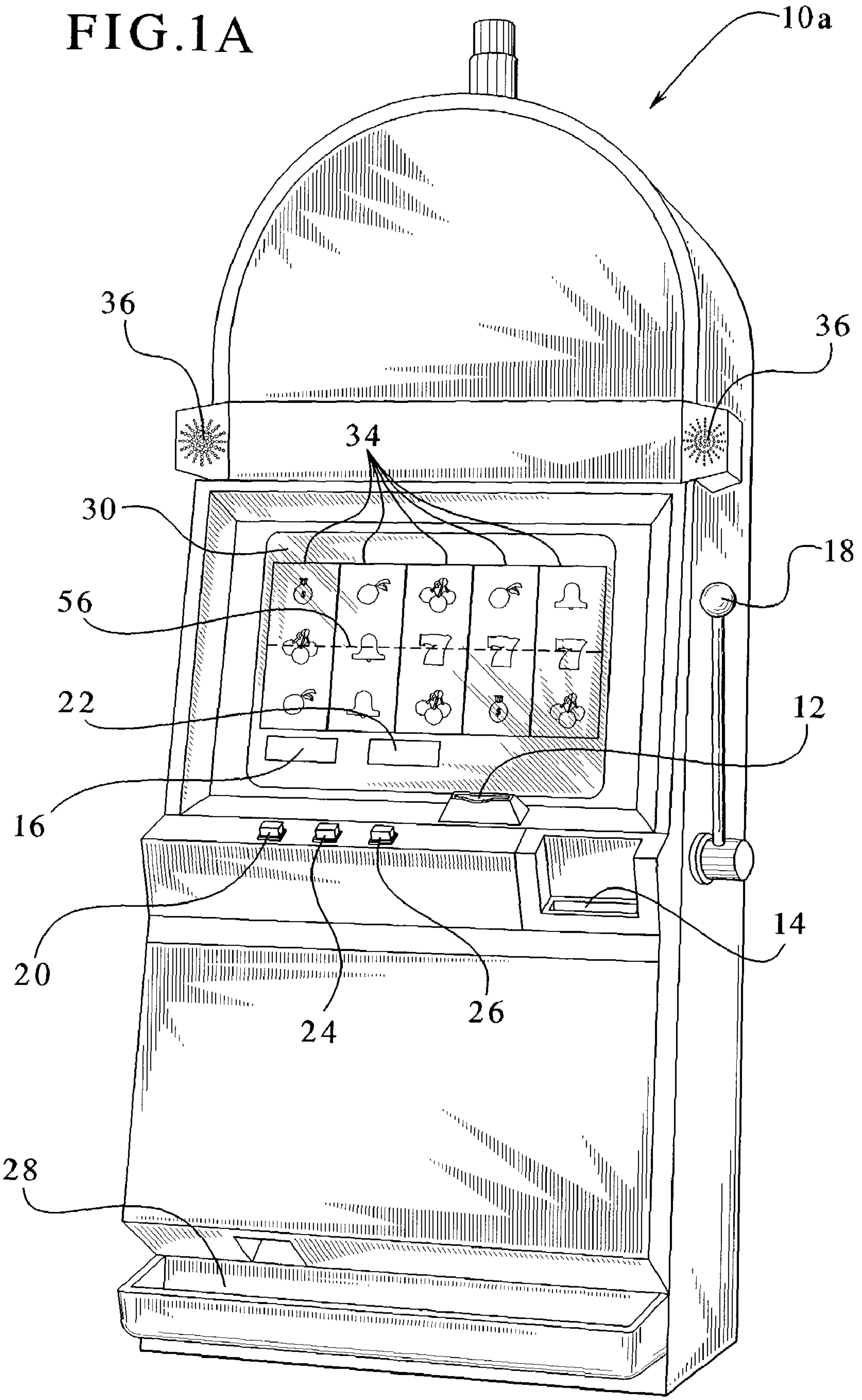
FIG. 1A is a front perspective view of one embodiment of the gaming device of the present invention.
Figure 1B:
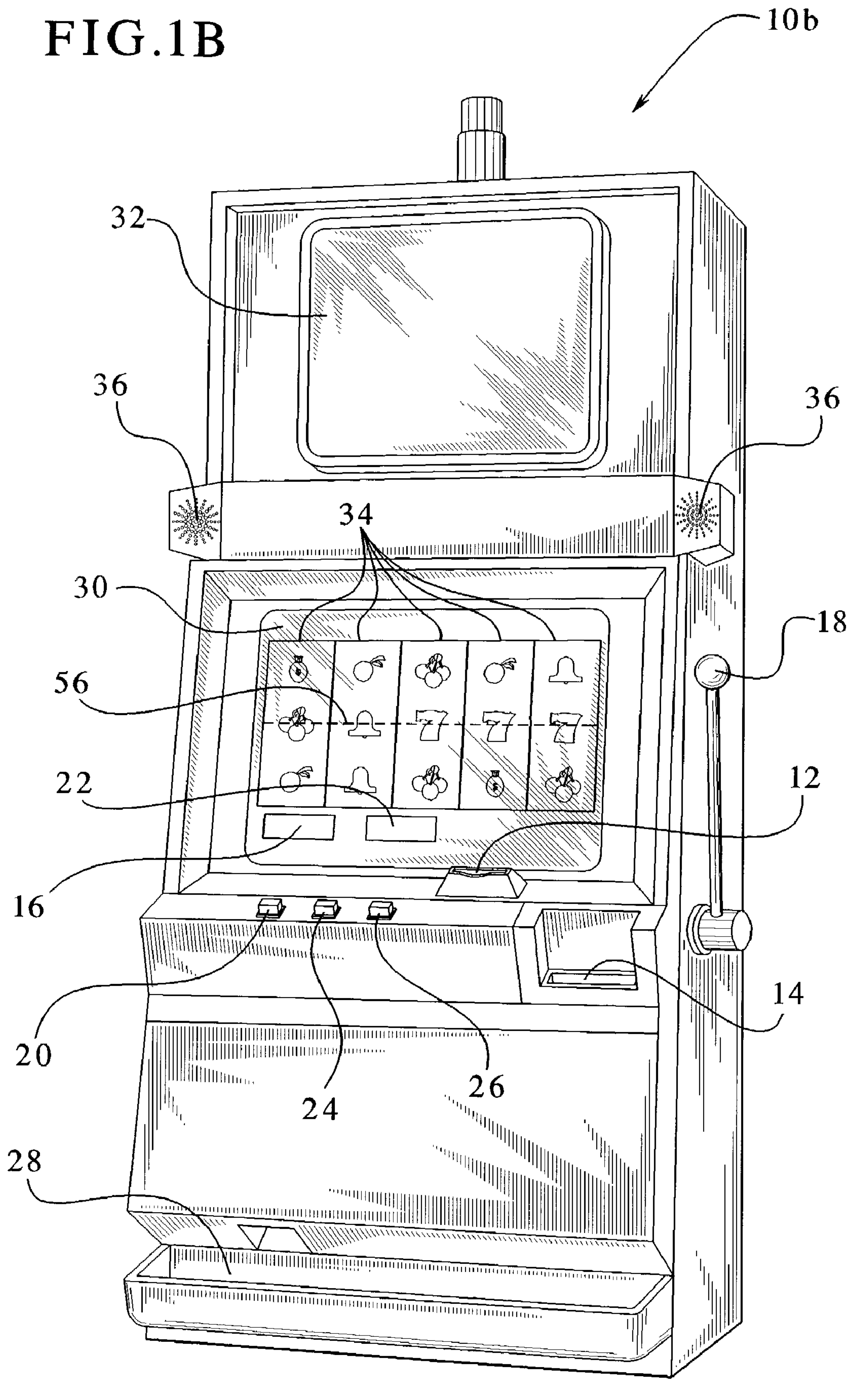
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, an upper display device 32, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
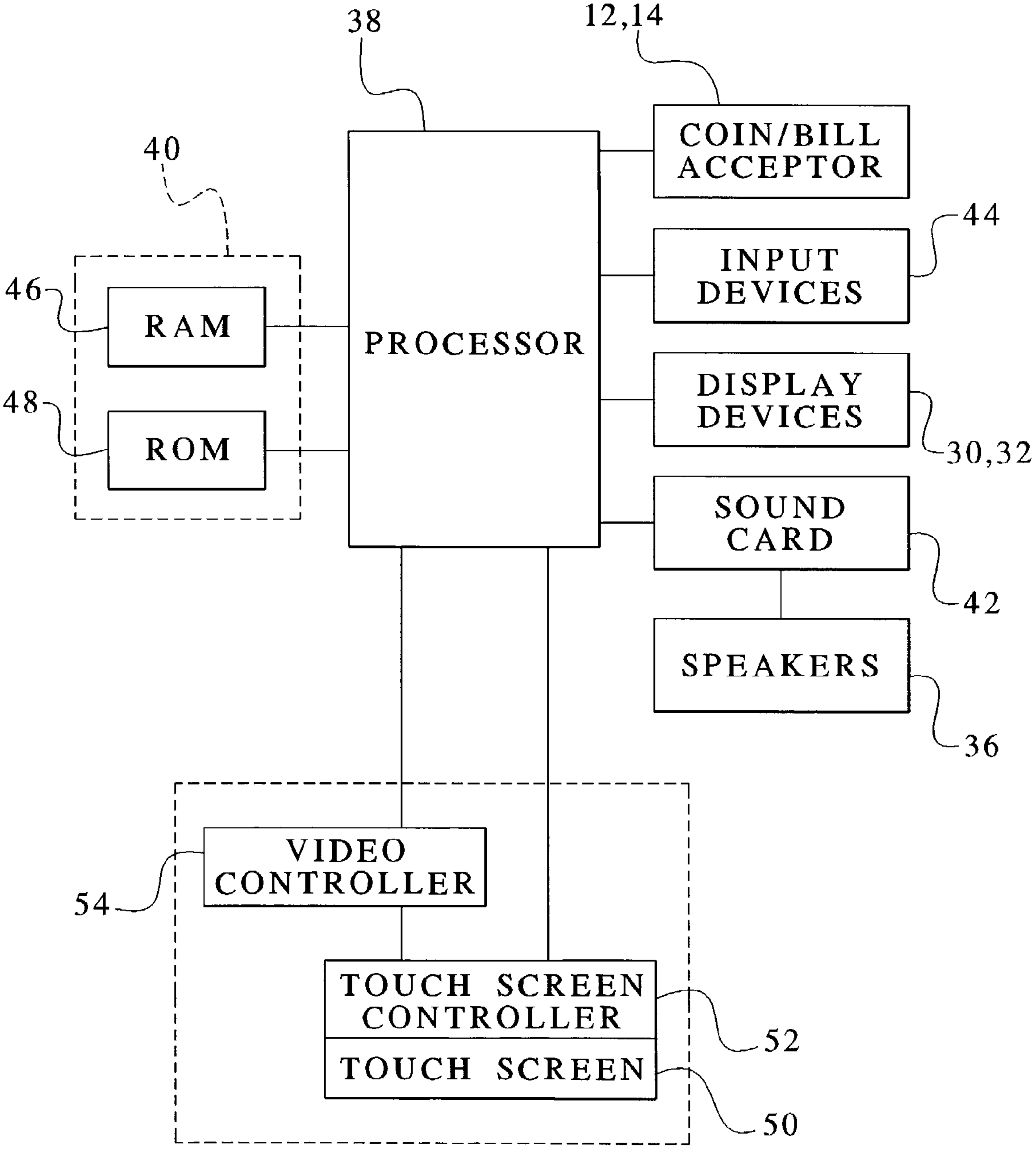
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device

10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Symbol or Award Elimination Bonus Game

In one embodiment of the present invention, if a player achieves a bonus triggering or qualifying condition during the primary game, the gaming device 10 initiates the secondary or bonus game of the present invention.

Figure 3A:
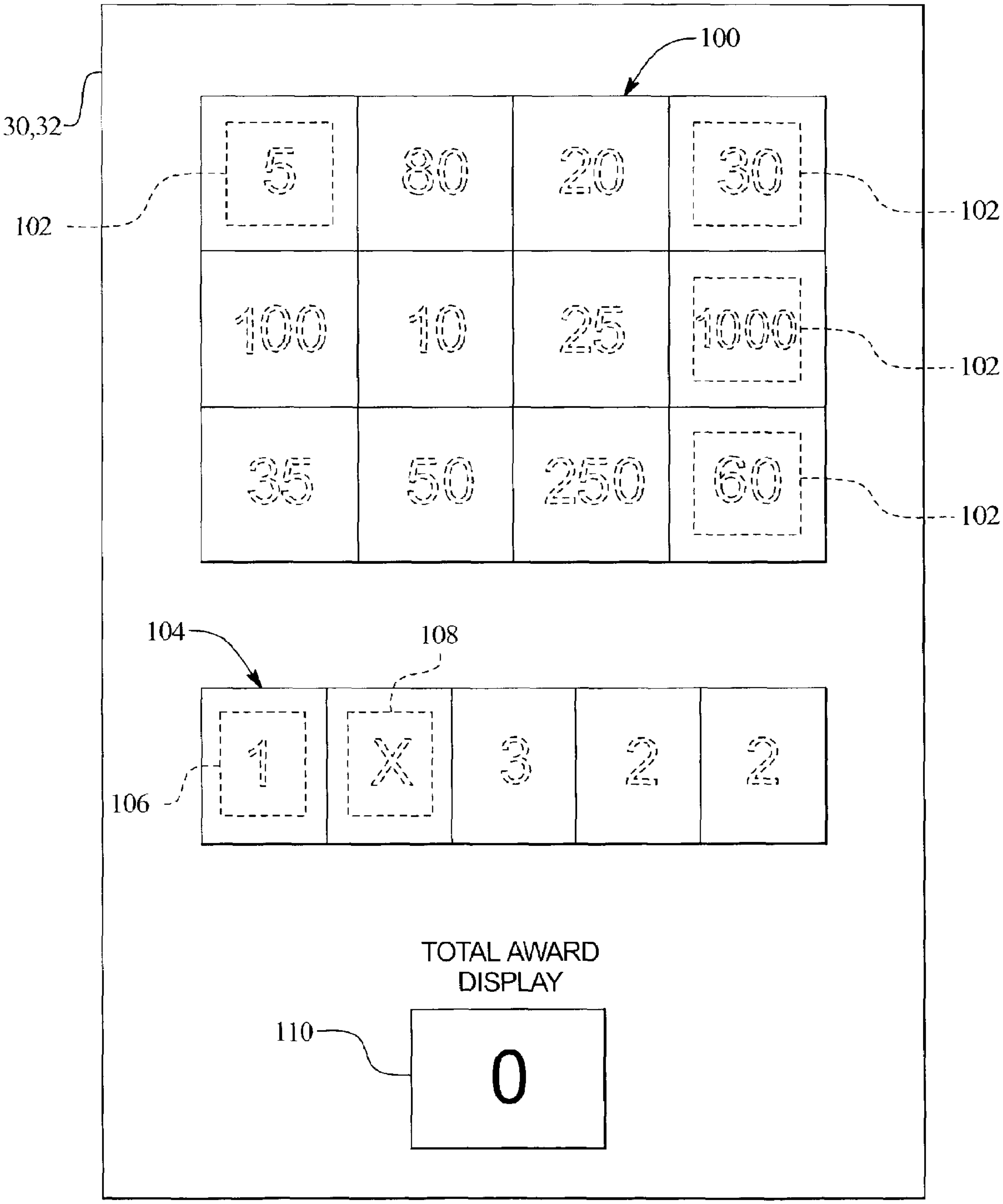
FIG. 3A is an enlarged elevation view of one of the display devices of FIGS. 1A and 1B, illustrating one embodiment of the present invention.

Referring to FIG. 3A, one embodiment of the present invention is illustrated. In this embodiment, the gaming device includes a display device such as one of the display devices 30 or 32 and a plurality of symbols 100 displayed on the display device. In one embodiment, the symbols are masked or hidden from the player at the start of the game and are revealed as the symbols are picked by the processor or the player in the game. In another embodiment, the symbols are displayed to the player and the processor randomly picks or highlights the symbols in the game. The gaming device also includes a plurality of selections 104. The selections include a number of picks 106 where the number of picks associated with each selection are initially masked or hidden from the player. In one embodiment, the number of picks associated with the selections are less than the number of symbols in the game. Thus, the game ends when the player runs out of picks. In another embodiment, the selections include a terminator symbol 108, which ends the game when the player picks the selection including the terminator symbol.

In a further embodiment, the gaming device or processor provides at least two picks to the player where the number of picks is less than the number of symbols displayed to the player in the game. In this embodiment, the processor randomly picks symbols in the game until the player runs out of picks. The numbers of picks associated with the selections are used by the processor to pick symbols from the plurality of symbols 100. It should be appreciated that the number of picks may be randomly determined, predetermined, based on a player's wager in the game or determined according to any suitable method. In one embodiment, the gaming device includes a wheel (not shown) having a plurality of sections. Each of the sections includes at least one pick of the symbols in a game. The processor activates or spins the wheel and a section indicator randomly indicates one of the sections on the wheel. The processor then picks symbols according to the number of picks associated with the indicated section on the wheel.

In one embodiment, the player picks one of the selections from the plurality of selections and reveals a number of picks of the symbols in a game. The player continues to pick the selections until there are no selections remaining. In another embodiment, the gaming device resets the selections after each pick of the selections by the player. For example, the gaming device displays four selections in a game. The player picks one of the four selections to reveal a number of picks of the symbols in the game. The gaming device randomly picks the symbols based on the revealed number of picks and then resets the selections so that a new set of four selections are displayed to the player prior to the next pick by the player. The player continues to pick one selection from the reset sets of selections for a designated number of picks of the selections in the game. The designated number of picks of the selections may be randomly determined, predetermined, determined based on a wager made by the player in a game or determined according to any other suitable determination method.

In another embodiment, the gaming device displays a plurality of selections on a display device where each of the selections includes a total number of picks of the symbols in a game. For example, the player picks one of the selections and receives six picks of the symbols for the game. The gaming device randomly picks six of the symbols in the game and then the game ends. The player receives the total amount of the awards associated with the picked symbols in the game. In one embodiment, the display device includes a touch screen where the player may physically pick one of the selections by touching or pressing the selections on the screen.

In one embodiment, the symbols 100 are arranged in a grid as shown in FIG. 3A. It should be appreciated, however, that the symbols may be arranged in any suitable shape or configuration as desired by the game implementor. In one embodiment, a plurality of awards 102 are associated with the symbols 100. The awards 102 may be credits, monetary or other values, prizes, free spins, free games, multipliers or any other suitable award. In another embodiment, the plurality of symbols 100 include one relatively large award and several relatively small awards. It should be appreciated that any suitable type of award or any suitable distribution of awards associated with the symbols may be employed in a game.

In this embodiment, the gaming device displays a number of selections 104 to the player. The selections 104 may include any desired number of selections. A number of picks 106 is randomly associated with each of the selections in the plurality of selections 104. The number of picks 106 associated with each selection are used by the processor to randomly select symbols from the plurality of symbols 100. In one embodiment, the number of picks are integers such as one, two or three. However, any suitable number of picks may be employed in a game. Additionally in this embodiment, the plurality of selections 104 include at least one terminator symbol 108. It should be appreciated that the selections may include one or more terminator symbols or no terminator symbols as desired by the game implementor.

Referring to FIG. 3B, a probability table 112 associated with the embodiment of FIG. 3A is illustrated. The probability table 112 includes the symbols in the embodiment shown in FIG. 3A in column 114 and a probability of picking each of those symbols in column 116. In this embodiment, the symbols include awards or values. The probability of picking each of the symbols having the associated awards is shown in column 114. Therefore, each symbol 100 has a probability of being picked by the processor or the player. In one embodiment, the symbols include a relatively large award and several relatively small awards as shown in FIG. 3B. In this embodiment, the probability of picking the symbol including the relatively large award is less than the probability of picking the symbols including the relatively small awards as shown in column 116 of the probability table 112. For example, in this table, the award symbol including the relatively large award of one thousand has a probability of 1% (1/100). The symbols including the relatively small awards, such as the awards of five, ten and twenty, have probabilities of being picked of 5%, 5% and 15%, respectively. Therefore in this embodiment, the player has a significantly greater chance of receiving a relatively small award than the relatively large award or awards. However, the picked symbols, including the probabilities associated with the symbols, are eliminated from further selection in the game. Therefore, the eliminated award symbols cannot be re-selected or picked again in the game. As the gaming device continues to pick the remaining symbols in the game, the probability of obtaining any of the remaining symbols proportionately increases including the probability of picking the award symbols including the relatively large awards as the play of the game progresses. The proportionate increase of the probabilities associated with the symbols will be described in the following paragraphs.

In the above embodiment, at the start of the game, the player has a one out of one hundred chance of receiving a symbol such as the award symbol including the award of one thousand as shown in the probability table 112 in FIG. 3B. This probability is very low in relation to the probabilities associated with the other award symbols available in the game. The award symbol including the relatively small awards such as the awards of twenty-five and thirty have probabilities of being picked of 20% and 20%, respectively. Thus, the player has a greater chance of receiving the awards of twenty-five or thirty before receiving the award of one thousand at the beginning of the game. The further the player progresses in the game, however, the probability of picking any one of the award symbols including the relatively large award or awards proportionately increases because the picked award symbols are eliminated and therefore the number of remaining award symbols decreases. Therefore, the proportionate share of the probabilities associated with each of the remaining or unpicked symbols increases because the sum of all of the probabilities decreases in the game.

For example, if the player picks one of the selections 104 and receives two picks associated with that selection, then the player has two opportunities or picks to obtain two awards from the plurality of symbols such as award symbols 100. The processor uses the two picks and randomly selects two of the award symbols from the plurality of award symbols 100 based on the probabilities 116 associated with those award symbols as displayed in the probability table 112. As the probability table illustrates, the probabilities associated with each of the award symbols forms a proportionate share of the sum or total of all of the probabilities associated with the award symbols. As an example, the award symbol including the award of five has a proportionate share of (5/100) or 5% out of the total of the probabilities associated with all of the award symbols, which is initially, 100%. Therefore, initially, the processor is more likely to select an award symbol including one of the relatively small awards because the probabilities associated with the relatively small awards are greater than the other probabilities in the table.

As another example, if the processor randomly picks the awards of twenty-five and thirty, then those awards are eliminated from being selected again in the game. Since each of those awards has been eliminated from the game, the chances or probabilities of receiving the other awards in the game with subsequent picks increases proportionately. As described above, the probabilities increase proportionately because each probability forms a proportionate share of the sum of all of the probabilities associated with the symbols in the game. Therefore, when an award symbol is picked in a game, the award symbol and the probability associated with that award symbol are eliminated from the game. As a result, the total or sum of all of the probabilities associated with the remaining or unpicked symbols, decreases because two of the probabilities have been eliminated. Therefore, the proportionate share of the probabilities associated with the remaining or unpicked award symbols increases because the sum of all of the remaining probabilities decreases.

In another embodiment, the probabilities associated with the unpicked symbol or symbols proportionately increase after each pick of the symbols in the game. In a further embodiment, the probabilities associated with the unpicked symbol or symbols proportionately increase after a plurality of picks of the symbols in the game. In this embodiment, the probabilities remain constant until a designated number of symbols are picked in the game. Therefore, although each picked symbol is eliminated in the game, one or more picked symbols may be picked again in the game. In this situation, the gaming device enables the player to pick one or more different symbols such as an unpicked symbol if the player picks a previously picked symbol in the game.

In this example, when the game started, the probability of picking the award symbol including the award of one thousand was one out of 100 or 1% of the total probability, which is 100%. After the award symbols including the awards of twenty-five and thirty were picked and eliminated, the probability of picking the award of one thousand increases to one out of sixty or 1.67% (i,e, 1% out of 60%) as shown in FIG. 3C. Thus, the probability of picking the award of one thousand originally had a probability of 1% wherein the probability of 1% formed a proportionate share of the total of the probabilities which was 100%. After the two awards were picked and eliminated from further selection in the game, the total of the probabilities decreased to 60%. As a result, the proportionate share of the probability associated with the award of one thousand increased from 1% out of 100% to 1% out of 60%. FIG. 3C illustrates how all of the probabilities of the remaining awards increase in the game. Therefore, as awards are picked and eliminated from subsequent selection, the chance or probability of picking the remaining awards in the game, and especially the relatively large awards, proportionately increase. Proportionately increasing the probability of picking the remaining awards and specifically, the relatively large awards increases players' enjoyment and excitement in the game.

Figure 4A:
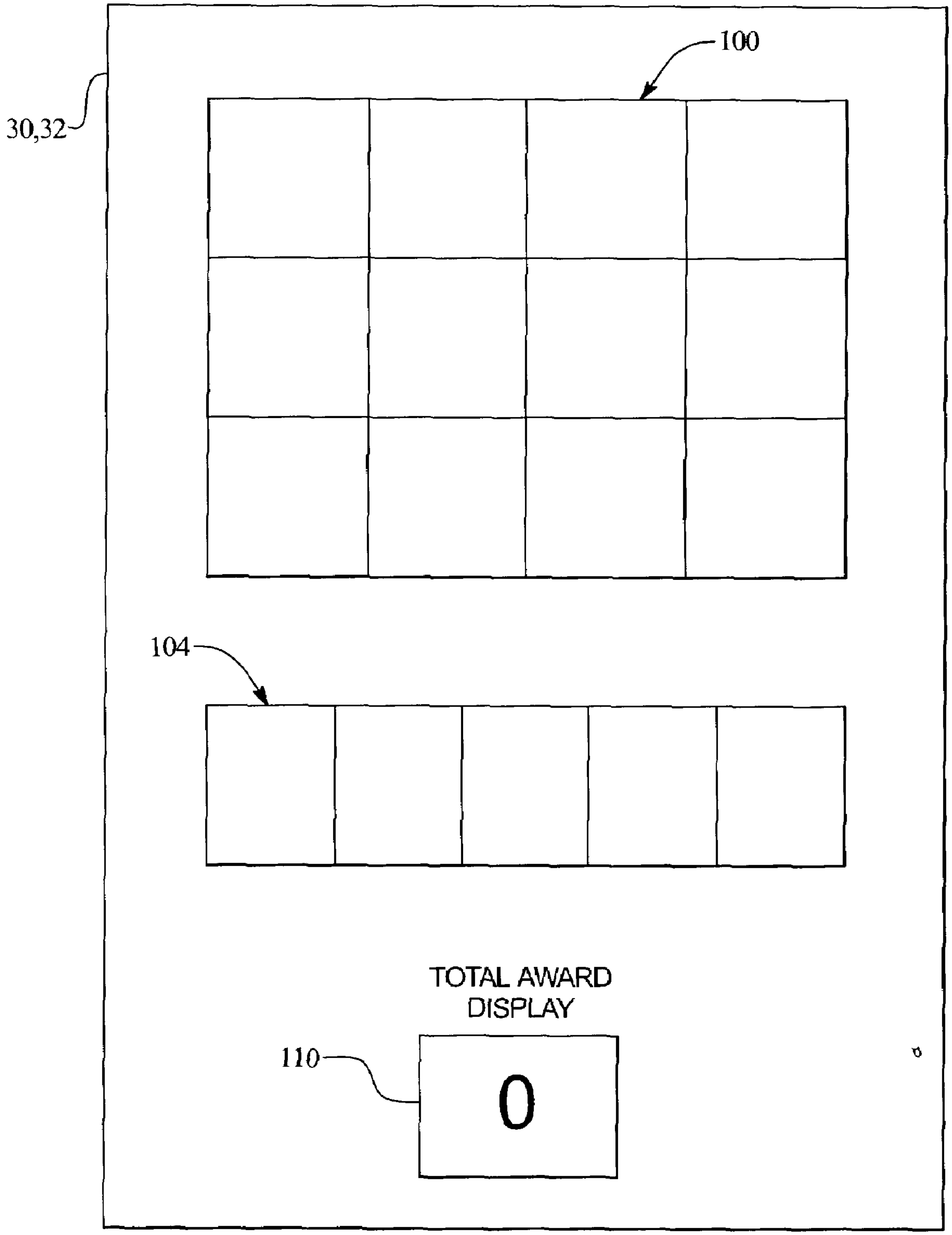
FIG. 4A is an enlarged elevation view of an example of the embodiment shown in FIGS. 3A and 3B where a player picks selections to obtain awards in the game.

Referring to FIGS. 4A to 4I, an example of the embodiment of FIGS. 3A and 3B is illustrated where the gaming device displays a plurality of award symbols 100, which are initially masked or hidden from a player, and five selections 104 which are also masked or hidden from the player. Additionally, a probability of being picked by the processor is associated with each of the award symbols as shown in FIG. 4B. In this example, the award table 112 displays the awards associated with the award symbols in the game and the probabilities of picking those award symbols. As shown in FIG. 4B, the award symbols including the relatively small awards such as twenty, twenty-five and thirty have greater probabilities of being picked by the processor such as 20%, 25% and 15%, respectively. These probabilities form a proportionate share of the total probability, which is 100% (i.e., the sum of all of the probabilities associated with the award symbols in the game). Therefore, the player is more likely to receive the award symbols including the relatively small awards at the beginning of the game. Furthermore, the player begins the game with an award of zero as indicated by the total award display 110.

Figure 4C:
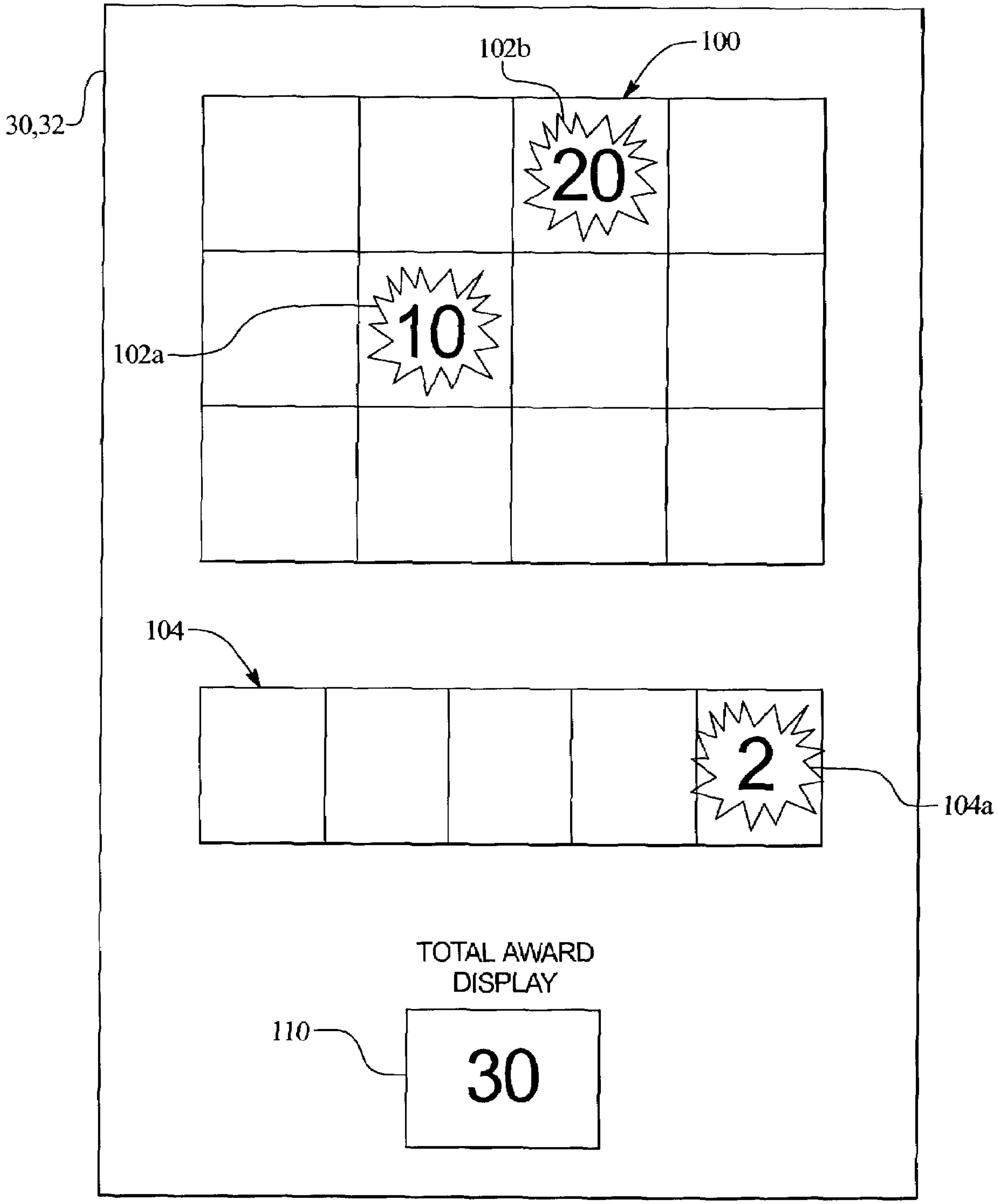
FIG. 4C is an enlarged elevation view of the embodiment of FIG. 3A where a player picks a selection and obtains the awards associated with two symbols picked by the processor.

Referring to FIG. 4C, a player picks one of the selections 104*a* in the game. The picked selection 104*a* reveals two picks, which are used by the processor to randomly pick two of the masked award symbols from the plurality of award symbols 100 displayed by the display device. In this example, the processor randomly picks the award symbols in the game based on the probabilities as shown in FIG. 4B. The processor randomly picks two of the award symbols 102*a* and 102*b* with the first two picks obtained by the player where the picked award symbols include awards of ten and twenty, respectively. The processor picks the awards of ten and twenty based on the probabilities associated with those awards in the game. The award symbols including the awards of ten and twenty have probabilities of being selected by the processor of 10% and 20%, respectively. Comparatively, the award symbols including the award of one thousand has a probability of (1/100) or 1%. Therefore, the processor is more likely to select the award symbols having the awards with greater probabilities such as the awards of ten and twenty than the award symbols having awards with lower probabilities. The selected awards of ten and twenty, including the probabilities associated with the award symbols including these awards, are eliminated and can not be selected again in this game. The awards of ten and twenty are added together and the player now has a total award of thirty as indicated by the total award display 110.

Because the awards picked from the plurality of award symbols are eliminated from further selection in the game, the probabilities of the processor picking the remaining or unpicked award symbols increase proportionately as shown in FIG. 4D. The sum of the probabilities associated with the award symbols prior to picking the award symbols including the awards of 10 and 20, was 100%. After picking those award symbols the overall probability or sum of the probabilities decreases proportionately based on the award symbol or symbols eliminated from the game. In this example, the total of the probabilities associated with the picked award symbols is 30% and therefore the total or sum of the probabilities associated with the remaining or unpicked award symbols is now 70%. Therefore, the proportionate share of each of the remaining probabilities associated with the remaining award symbols increases because the total or overall probability (i.e, the sum of all of the probabilities) decreased in the game. In FIG. 4D, the probabilities change or increase such that the remaining award symbols, which include awards of five, twenty-five, thirty, thirty-five, fifty, sixty, eighty, one hundred, two hundred fifty and one thousand now have probabilities of being selected by the processor of 7.14% (5/70), 35.71% (25/70), 21.43% (15/70), 7.14% (5/70), 7.14% (5/70), 7.14% (5/70), 5.71% (4/70), 4.29% (3/70), 2.86% (2/70) and 1.43% (1/70), respectively. The fractional quantities in the parentheses associated with each probability indicate the proportionate share of each of those probabilities based on the total probability of 70%. Now the player has a greater chance of obtaining one of the relatively large awards than at the beginning of the game. In addition, the award probabilities continue to proportionately increase as the player progresses in the game because more award symbols are eliminated from the game.

Figure 4E:
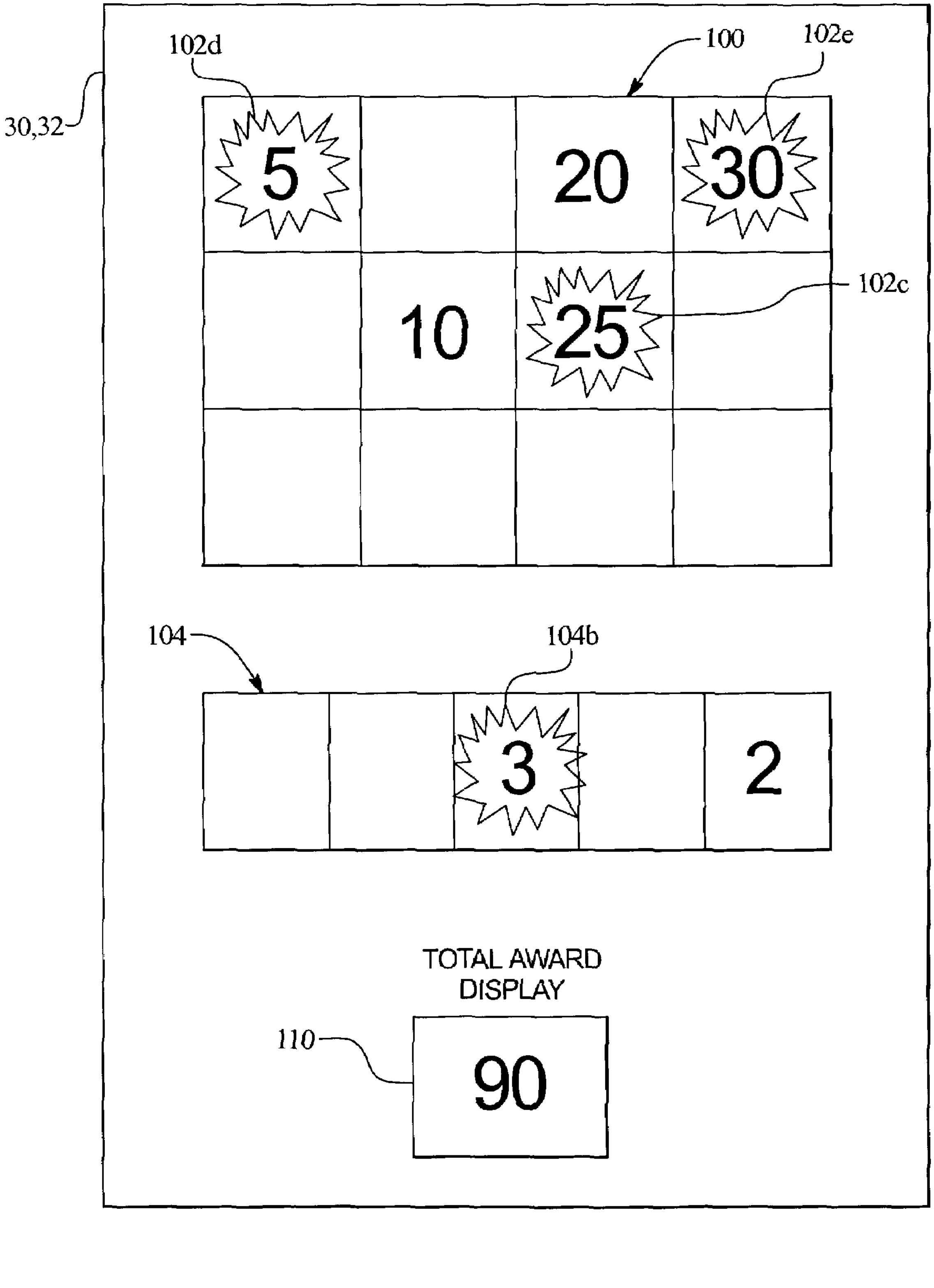
FIG. 4E is an enlarged elevation view of the embodiment of FIG. 4A where the player picks another selection and obtains awards associated with symbols picked by the processor.

Referring to FIG. 4E, the player picks another selection 104. It should be appreciated that the player will continue to pick selections until the player picks the terminator symbol 108, which is designated as an "X" in this example. In FIG. 4E, the player picks selection 104, which reveals three picks. The gaming device or processor will now use the three picks obtained by the player to randomly pick from the plurality of award symbols 100. The processor randomly picks award symbols 102*c*, 102*d* and 102*e* which reveal awards of twenty-five, five and thirty, respectively. The awards are added to the players total award and the player now has a total award of ninety as displayed by the total award display 110. There are three selections 104 remaining in the game.

Referring to FIG. 4F, because three more awards, specifically the awards of five, twenty-five and thirty have been eliminated from the game, the player now has a greater chance or probability of receiving one of the remaining awards and in particular, the relatively large award or awards in the game. The probabilities associated with the remaining award symbols increase proportionately based on the number of award symbols picked and eliminated from further selection by the processor and the specific awards picked by the processor. Thus, the total or sum of the probabilities of the remaining or unpicked award symbols is decreased to 25%, since the proportionate shares associated with the picked award symbols are (5/70), (25/70) and (15/70) or at total of (45/70). The proportionate share of the probabilities associated with the remaining award symbols therefore increases accordingly because the overall or total probability has decreased in the game. The awards associated with the remaining award symbols in the game in this example are the awards of thirty-five, fifty, sixty, eighty, one hundred, two hundred fifty, and one thousand. The probabilities associated with the award symbols including these awards increase proportionately and are now 20.00% (5/25), 20.00% (5/25), 20.00% (5/25), 16.00% (4/25), 12.00% (3/25), 8.00% (2/25) and 4.00% (1/25), respectively. As is evident by the increased probabilities, the award of one thousand now has a probability of being selected by the processor of 4.00%. This percentage is four times greater than the probability associated with this award at the beginning of the game. Therefore, the player is four times more likely to obtain the award of one thousand at this point in the game than they were at the beginning of the game. Additionally, the probability of obtaining an award symbol including one of the relatively large awards (i.e., 100, 250 or 1000) is 24%.

Figure 4G:
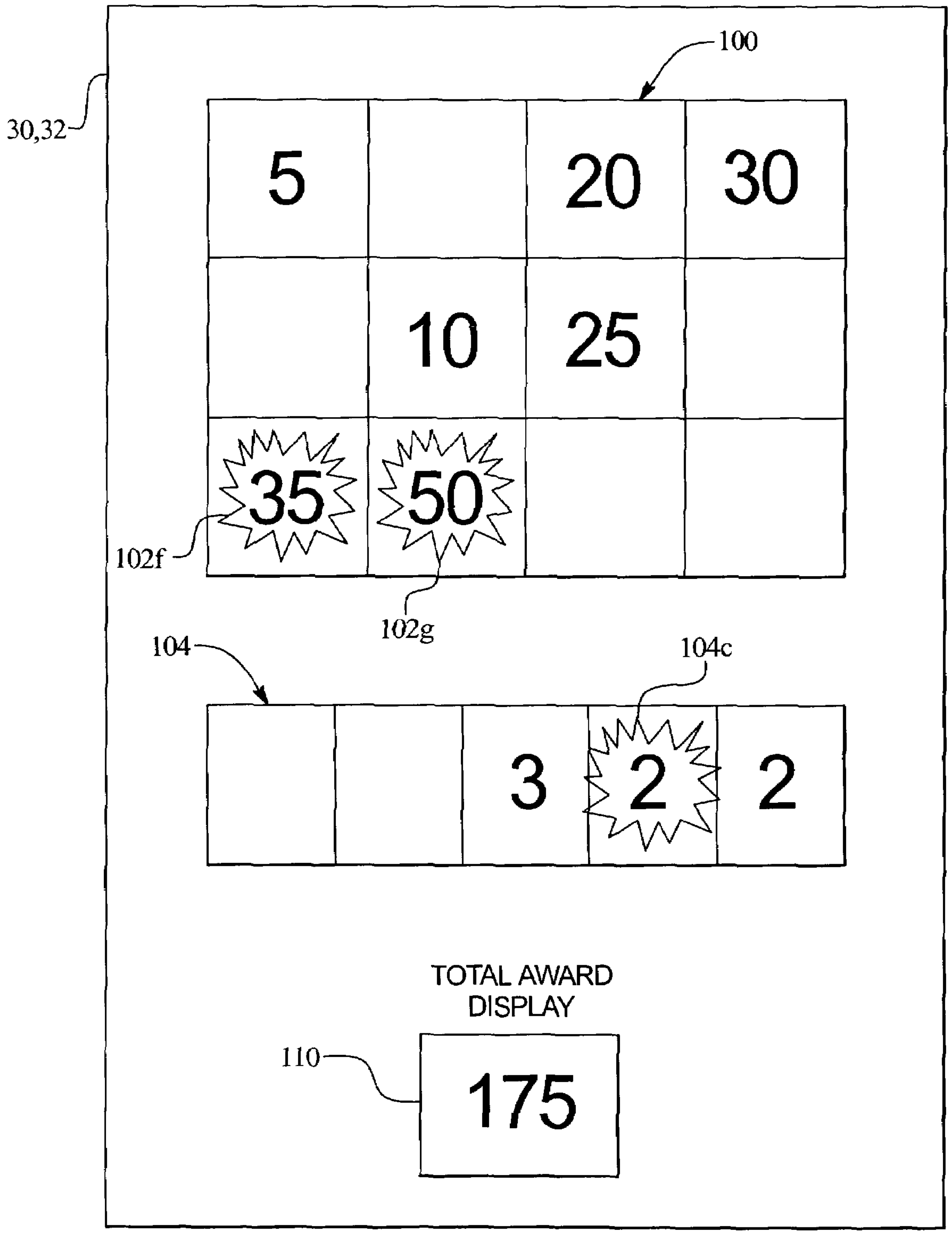
FIG. 4G is an enlarged elevation view of the embodiment of FIG. 4A where the player picks another selection in the game and obtains the awards associated with the award symbols picked by the processor.

Referring to FIG. 4G, the player picks another selection from the plurality of selections 104. The player picks selection 104*c* which reveals two picks. The processor randomly picks two of the award symbols 100 based on the probabilities of the awards associated with the remaining award symbols. The processor randomly picks the award symbols including awards of thirty-five and fifty. These awards are eliminated from further selection in the game. Therefore, the total probability associated with the unpicked award symbols remaining in the game are now based on a total probability of 15%. Thus, the proportionate share of the probabilities associated with the remaining or unpicked award symbols increases because the overall symbols available have decreased. The player has two selections remaining from the plurality of selections 104 in the game. The player's new total award is one hundred seventy-five as displayed in the total award display 110.

Referring to FIG. 4H, the probabilities of picking the remaining award symbols having awards of sixty, eighty, one hundred, two hundred fifty, and one thousand have increased to 33.33% (5/15), 26.67% (4/15), 20.00% (3/15), 13.33% (2/15) and 6.67% (1/15), respectively, because the proportionate share of the probabilities associated with these award symbols increased as shown in the parentheses for each symbol. Thus, the player now has an even greater chance or probability of obtaining one or more of the relatively large awards than in the previous picks. In particular, the probability of picking the award symbol including the award of one thousand is now 6.67% because the proportionate share related to this award has increased from 1% out of 100% or (1/100) to 1% out of 15% or (1/15). At the beginning of the game, the probability of picking the award of one thousand was 1.00%. Therefore, as the player progressed through the game, the probability of picking the award symbol having the award of one thousand increased more than six times from the beginning of the game. Increasing the probabilities of picking the award symbol gives the player a greater chance to obtain the larger awards in a game, and increases the excitement and enjoyment for the player in the game.

Figure 4I:
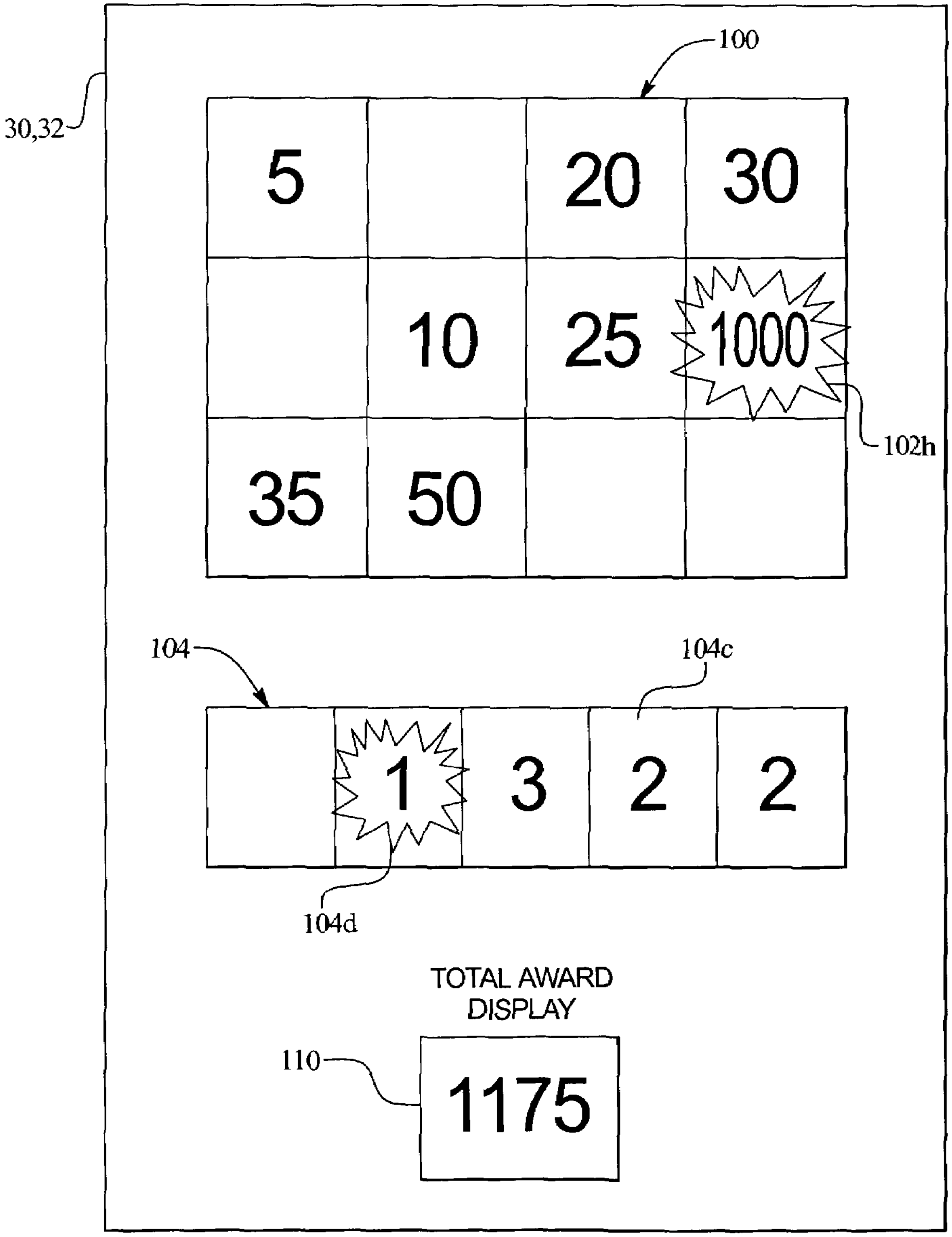
FIG. 4I is an enlarged elevation view of the embodiment of FIG. 4A where the player makes another selection in the game and obtains the jackpot award associated with the symbol picked by the processor.

Referring to FIG. 4I, the player picks a fourth selection in the game. With the fourth pick, the player picks the selection 104*d* which reveals one pick. The processor randomly picks the award symbol 102*h* which reveals an award of one thousand (i.e., the jackpot award). Although the probability that the processor would pick the award symbol including the award of one thousand was only 6.67%, this probability was still greater than at the beginning of the game because all of the picked awards were eliminated during the game. As this pick illustrates, the further the player progresses in the game the more likely it is that the player will pick one of the award symbols including the relatively large awards such as the jackpot award. In FIG. 4I, the award of one thousand is added to the players total award and the player now has a total award of one thousand one hundred seventy-five as indicated by the total award display 110.

There is only one selection remaining in the game. The terminator symbol, however is associated with the selection and therefore there are no more picks remaining in the game. In one embodiment, if the terminator symbol is the only remaining selection left in the game, the game automatically ends when the terminator symbol is associated with the last remaining selection. In another embodiment, the player selects the final selection and reveals the terminator symbol. Then, the game ends and the player receives the total award indicating the total award display 110. In this example, the game automatically ends when the terminator symbol is associated with the only remaining selection. The player receives the total award of one thousand one hundred seventy-five as indicated in the total award display 110 and the game ends.

Figure 5A:
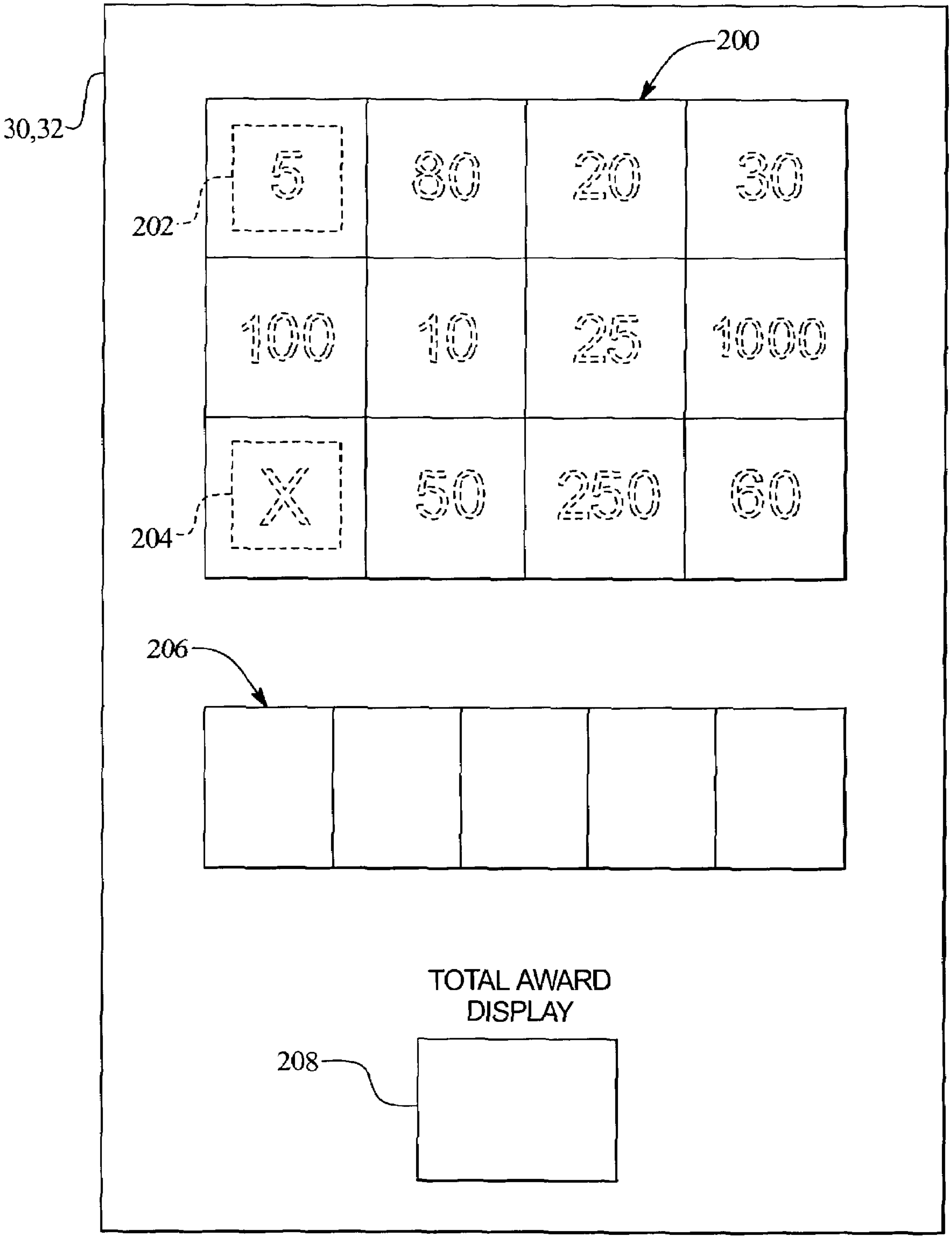
FIG. 5A is an enlarged elevation view of another embodiment of the present invention.

Referring to FIGS. 5A and 5B, another embodiment of the present invention is illustrated where at least one terminator symbol 204 is associated with the plurality of award symbols 200. The terminator symbol adds an additional level of risk in the game and the potential for the game to end when the processor picks one or more of the award symbols 200. A probability table 210 illustrated in FIG. 5B, includes the awards associated with the award symbol and the terminator symbol as well as the probabilities of the processor picking those symbols in the game. Specifically, column 212 in the probability table 210 includes the specific awards and the terminator symbol 204 in the game. Column 214 in the probability table 210 includes the probabilities of a processor picking the award symbols including the awards and/or terminator symbol in the game. The probability associated with the terminator symbol may be any suitable probability desired by the game implementor. In FIG. 5B, the terminator symbol has a probability of 20% and a proportionate share of the total probability of 20% out of 100% or (20/100). Comparatively, the probability of picking the award symbol including the award of one thousand is 1%. Thus, the probability of picking the terminator symbol is twenty times more likely than picking the award symbol including the award of one thousand. Additionally, the probability of picking the terminator symbol increases proportionately as more symbols are picked in the game. It should be appreciated that one or more terminator symbols may be associated with the plurality of award symbols 200 and/or the selections 206 in a game.

In a further embodiment, the probabilities associated with the award symbols and/or the terminator symbol or symbols change after each random pick by the processor. The probabilities may change by a predetermined amount or a random amount. In another embodiment, the probability associated with the award symbols and/or the terminator symbols change after a plurality of picks by the processor. It should be appreciated that the probabilities may increase, decrease or remain unchanged after each pick or a plurality of picks by the processor. Additionally, the probabilities associated with the terminator symbol may be greater, the same as or less than the probabilities associated with one or more of the award symbols in a game.

Figure 6:
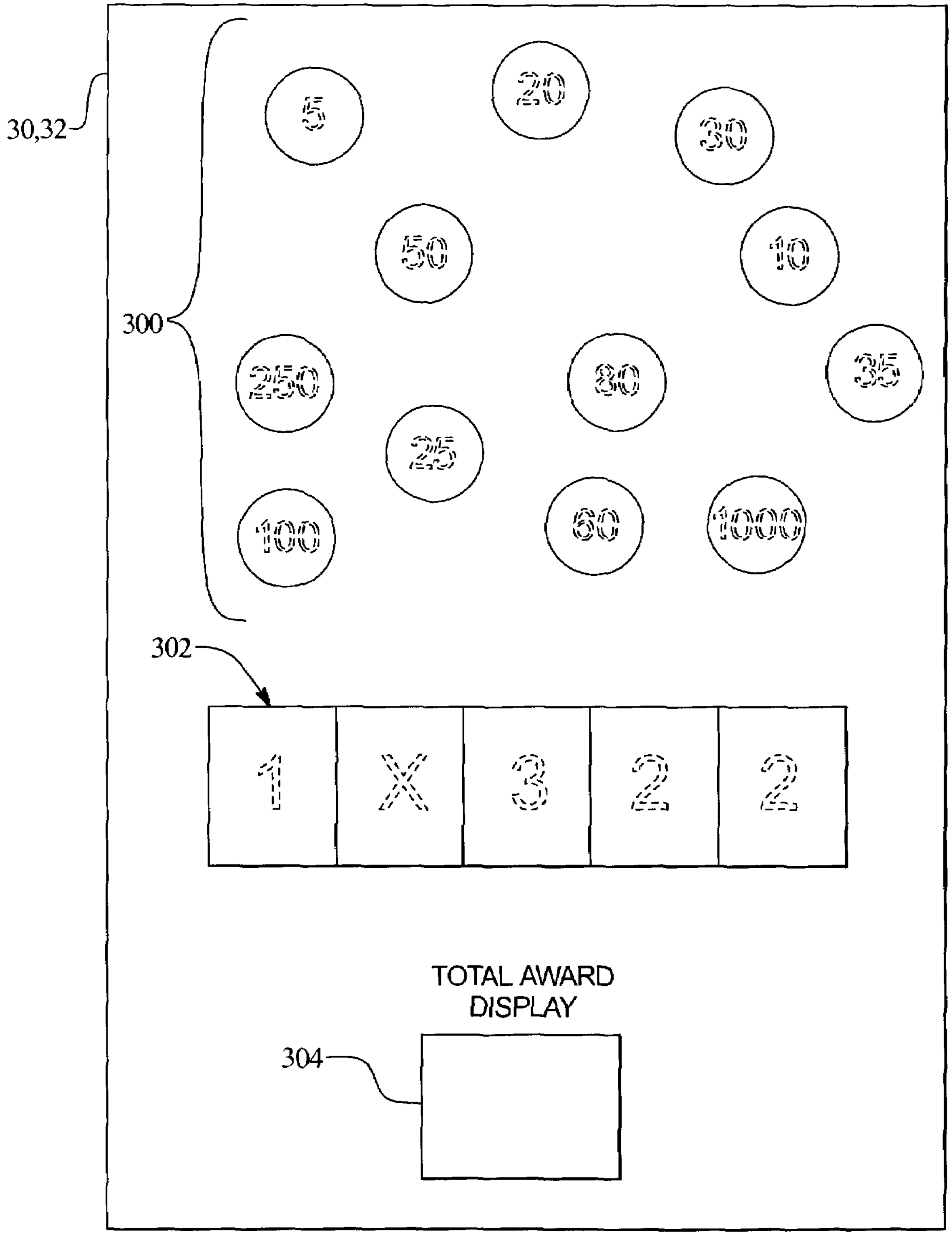
FIG. 6 is an enlarged elevation view of further embodiment of the present invention.

Referring to FIG. 6, another embodiment of the present invention is illustrated where the award symbols 300 are different shapes or configurations. In FIG. 6, the award symbols are circle shaped and are randomly displayed by the display device. It should be appreciated that the award symbols may be any suitable symbol, shape or configuration as desired by the game implementor. Additionally, the award symbols may be represented by shapes or themes associated with a particular game. In FIG. 6, the player picks selections from the plurality of the selections 302 to obtain one or more of the awards associated with the award symbols 300. The total award obtained by the player is displayed in the total award display 304.

In an alternative embodiment, the present invention includes an offer and acceptance game. In this embodiment, the gaming device displays a plurality of symbols and a plurality of selections to the player. Each of the selections includes a number of picks of the symbols. In addition, at least one of the selections includes a terminator. The player picks the selections and the gaming device picks the number of symbols corresponding to the number of picks associated with each of the selections picked by the player in the game. The gaming device provides an award associated with each of the picked symbols to the player. However, if the player picks a selection including a terminator, the game ends and the gaming device decreases the player's total award in the game. In one embodiment, the gaming device decreases the player's total award by a predetermined amount such as decreasing the player's total award in half when the player picks a selection including a terminator. The gaming device provides the player with the decreased award and ends the game. It should be appreciated that the gaming device may decrease the total award by a predetermined amount, a randomly determined amount or by any suitable amount. In another embodiment, the gaming device provides a consolation award, which is less than the player's total award in the game. Thus, the player may accept the total award at any point in the game or risk all or a portion of the total award and continue picking selections in the game.

Although the present invention is described in a secondary or bonus game, it should be appreciated that the present invention may be employed in a primary or base game in the gaming device.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

at least one display device configured to display:

(a) a play of a game, and (b) each of a quantity of randomly pickable symbols in the play of the game, the quantity being at least three, wherein each one of the randomly pickable symbols has a probability of being randomly picked, at least two of the randomly pickable symbols having different probabilities of being randomly picked, and wherein for each randomly pickable symbol, the probability of being randomly picked is based on a number of times that symbol occurs in the game, at least two of the randomly pickable symbols occurring a plurality of times in the play of the game;

at least one input device;

at least one processor; and at least one memory device configured to store a plurality of instructions which when executed by the at least one processor cause the at least one processor to operate with the at least one display device and the at least one input device, for the play of the game, to:

(a) before any of the symbols are randomly picked:

(i) determine a number of picks of the symbols, wherein the determined number of picks is less than the quantity of the symbols, and (ii) display the determined number of picks of the symbols, (b) display each of the quantity of symbols, and (c) thereafter, for each sequential pick of the displayed determined number of picks of the displayed symbols:

(i) randomly pick at least one of the displayed symbols based on the probabilities, (ii) provide an award associated with each randomly picked symbol to a player, and (iii) if a designated number of symbols have been randomly picked, said designated number of symbols being at least one and less than the displayed determined number of picks:

(1) eliminate each and every occurrence of the randomly picked symbol from subsequent random picks of the unpicked displayed symbols remaining in the play of the game, and (2) for at least one subsequent random pick of the displayed symbols, proportionately increase the probabilities associated with the unpicked symbols remaining in the play of the game based on the probability associated with the randomly picked symbol.

2. The gaming device of claim 1, wherein the probabilities associated with at least two of the unpicked symbols are proportionately increased by different amounts.

3. The gaming device of claim 1, wherein more than two but less than all of the probabilities associated with the symbols are different.

4. The gaming device of claim 1, wherein all of the probabilities associated with the symbols are different.

5. The gaming device of claim 1, wherein the designated number of symbols is one and the probabilities associated with the unpicked symbols proportionately increase after each pick of the determined number of picks of the symbols.

6. The gaming device of claim 1, wherein the designated number of symbols is at least two and the probabilities associated with the unpicked symbols proportionately increase after at least two random picks.

7. The gaming device of claim 6, wherein the instructions, when executed by the at least one processor, cause the at least one processor to enable at least one of the symbols to be randomly picked multiple times in the game before each an every occurrence of said at least one symbol randomly picked multiple times is eliminated.

8. The gaming device of claim 1, wherein the determined number of picks is randomly determined.

9. The gaming device of claim 1, wherein the determined number of picks is predetermined.

10. The gaming device of claim 1, wherein the determined number of picks is based on a wager made by the player.

11. The gaming device of claim 1, which includes a plurality of selections, wherein each of the plurality of the selections includes at least one pick of the symbols, wherein at least two of the selections include different numbers of picks and wherein the determined number of picks of the symbols is determined by picking at least one of the selections.

12. The gaming device of claim 11, wherein each of the selections includes a total number of picks of the symbols in the game and the total number of picks of the symbols corresponds to the displayed determined number of picks of the symbols.

13. The gaming device of claim 11, wherein the instructions, when executed by the at least one processor, cause the at least one processor to cause the at least one display device to display the selections.

14. The gaming device of claim 13, wherein the at least one input device is a touch screen and wherein the instructions, when executed by the at least one processor, cause the at least one processor to enable a player to pick one of the selections with the touch screen to obtain a total number of picks in the game, wherein the total number of picks of the symbols corresponds to the displayed determined number of picks of the symbols.

15. The gaming device of claim 11, wherein the instructions, when executed by the at least one processor, cause the at least one processor to reset the selections after each pick of the selections by the player.

16. The gaming device of claim 11, wherein the instructions, when executed by the at least one processor, cause the at least one processor to reset the selections after a plurality of picks of the selections by the player.

17. The gaming device of claim 11, wherein at least one of the selections includes a terminator.

18. The gaming device of claim 17, wherein the instructions, when executed by the at least one processor, cause the at least one processor to cause a total award to be provided to the player based on the randomly picked symbols, wherein the total award is decreased by a predetermined amount when the player picks any of the selections including a terminator.

19. The gaming device of claim 18, wherein the total award is decreased by approximately 50%.

20. The gaming device of claim 17, wherein the instructions, when executed by the at least one processor, cause the at least one processor to cause a total award to be provided to the player based on the randomly picked symbols, wherein the total award is decreased by a randomly determined amount when the player picks any of the selections including a terminator.

21. The gaming device of claim 17, which includes a consolation award, wherein the instructions, when executed by the at least one processor, cause the at least one processor to provide the player with the consolation award when the player picks any selection or selections including a terminator.

22. The gaming device of claim 1, wherein the symbols include one relatively large award and a plurality of relatively small awards.

23. The gaming device of claim 22, wherein the probability associated with the symbol including the relatively large award is less than a plurality of the probabilities associated with the symbols including the relatively small awards.

24. The gaming device of claim 22, wherein the probability associated with the symbol including the relatively large award is less than all of the probabilities associated with the symbols including the relatively small awards.

25. The gaming device of claim 1, wherein at least one of the symbols includes a terminator symbol.

26. The gaming device of claim 25, wherein the probability associated with symbol including the terminator symbol is greater than at least one of the probabilities associated with the symbols including awards.

27. The gaming device of claim 25, wherein the probability associated with symbol including the terminator symbol is greater than a plurality of the probabilities associated with the symbols including awards.

28. The gaming device of claim 25, wherein the probability associated with the symbol including the terminator symbol is greater than each of the probabilities associated with the symbols including awards.

29. A gaming device comprising:

at least one display device configured to display:

(a) a play of a game, and (b) each of a quantity of randomly pickable symbols in the play of the game, the quantity being at least three, wherein:

(i) at least one of said symbols includes an award, (ii) at least one of said symbols includes a terminator, (iii) each one of the randomly pickable symbols has a probability of being randomly picked, at least two of the randomly pickable symbols having different probabilities of being randomly picked, and (iv) for each randomly pickable symbol, the probability of being randomly picked is based on a number of times that symbol occurs in the game, at least two of the randomly pickable symbols occurring a plurality of times in the play of the game;

at least one input device;

at least one processor; and at least one memory device configured to store a plurality of instructions which when executed by the at least one processor cause the at least one processor to operate with the at least one display device and the at least one input device, for the play of the game, to:

(a) before any of the symbols are randomly picked:

determine a number of picks of the symbols, wherein the number of picks is less than the quantity of the symbols, and (ii) display the determined number of picks of the symbols, (b) display each of the quantity of symbols; and (c) thereafter, for each sequential pick of the displayed determined number of picks of the displayed symbols:

(i) randomly pick at least one of the displayed symbols based on the probabilities, (ii) terminate the game when the randomly picked symbol includes the terminator, (iii) indicate any award associated with each randomly picked symbol, and (iv) if a designated number of symbols have been randomly picked, said designated number of symbols being at least one and less than the displayed determined number of picks:

(1) eliminate each and every occurrence of the randomly picked symbol from subsequent random picks of the unpicked displayed symbols remaining in the play of the game, and (2) for at least one subsequent random pick of the displayed symbols, proportionately increase the probabilities associated with the unpicked symbols remaining in the play of the game based on the probability associated with the randomly picked symbol.

30. The gaming device of claim 29, wherein the probabilities associated with at least two of the unpicked symbols are proportionately increased by different amounts.

31. The gaming device of claim 29, wherein more than two but less than all of the symbols have different probabilities.

32. The gaming device of claim 29, wherein all of the symbols have different probabilities.

33. The gaming device of claim 29, wherein the at least one symbol including the terminator has a greater probability of being picked than at least one of the symbols including an award.

34. The gaming device of claim 29, wherein the at least one symbol including the terminator has a greater probability of being picked than a plurality of the symbols including an award.

35. The gaming device of claim 29, wherein the at least one symbol including the terminator has a greater probability of being picked than all of the symbols including an award.

36. The gaming device of claim 29, wherein a plurality of the symbols include a plurality of terminators.

37. A gaming device comprising:

at least one display device configured to display:

(a) a play of a game, and (b) each of a quantity of randomly pickable symbols in the play of the game, the quantity being at least three, wherein each one of the randomly pickable symbols has a probability of being randomly picked, at least two of the randomly pickable symbols having different probabilities of being randomly picked, and wherein for each randomly pickable symbol, the probability of being randomly picked is based on a number of times that symbol occurs in the play of the game, at least two of the randomly pickable symbols occurring a plurality of times in the play of the game;

at least one input device;

at least one processor; and at least one memory device configured to store a plurality of instructions which when executed by the at least one processor cause the at least one processor to operate with the at least one display device and the at least one input device, for the play of the game, to:

(a) before any of the symbols are randomly picked, display a plurality of selections, said selections each including at least one of:

(i) a number of picks of said symbols, wherein at least two of the selections include different numbers of picks, and (ii) a terminator symbol, (b) receive an input from a player, the received input corresponding to a pick of one of the displayed selections, (c) terminate the game if the picked selection includes the terminator symbol, (d) display the number of picks associated with the picked selection if the picked selection includes the number of picks, (e) display each of the quantity of symbols, and (f) thereafter for each sequential pick of the displayed number of picks of the displayed symbols:

(i) randomly pick at least one of the displayed symbols based on the probabilities, (ii) indicate an award associated with each randomly picked symbol, and (iii) if a designated number of symbols have been randomly picked, said designated number of symbols being at least one and less than the displayed number of picks:

(1) eliminate each and every occurrence of the randomly picked symbol from subsequent random picks of the unpicked displayed symbols remaining in the play of the game, and (2) for at least one subsequent random pick of the displayed symbols, proportionately increase the probabilities associated with the unpicked symbols remaining in the play of the game based on the probability associated with the randomly picked symbol.

38. The gaming device of claim 37, wherein the probabilities associated with at least two of the unpicked symbols are proportionately increased by different amounts.

39. The gaming device of claim 37, wherein more than two of the symbols have different probabilities.

40. The gaming device of claim 37, wherein all of the symbols have different probabilities.

41. The gaming device of claim 37, wherein the designated number of symbols is one and the probabilities associated with the unpicked symbols proportionately increase after each random pick.

42. The gaming device of claim 37, wherein the designated number of symbols is at least two and the probabilities associated with the unpicked symbols proportionately increase after at least two random picks.

43. The gaming device of claim 42, wherein the instructions, when executed by the at least one processor, cause the at least one processor to enable at least one of the symbols to be randomly picked multiple times before each and every occurrence of said symbol randomly picked multiple times is eliminated.

44. The gaming device of claim 37, wherein the symbols include one relatively large award and a plurality of relatively small awards.

45. The gaming device of claim 44, wherein the probability associated with the symbol including the relatively large award is less than a plurality of the probabilities associated with the symbols including the relatively small awards.

46. The gaming device of claim 44, wherein the probability associated with the symbol including the relatively large award is less than all of the probabilities associated with the symbols including the relatively small awards.

47. The gaming device of claim 37, wherein one of the symbols includes a terminator.

48. The gaming device of claim 47, wherein the probability associated with symbol including the terminator is greater than at least one of the probabilities associated with the symbols including awards.

49. The gaming device of claim 47, wherein the probability associated with symbol including the terminator is greater than a plurality of the probabilities associated with the symbols including awards.

50. The gaming device of claim 47, wherein the probability associated with symbol including the terminator is greater than all of the probabilities associated with the symbols including awards.

51. The gaming device of claim 37, wherein the instructions, when executed by the at least one processor, cause the at least one processor to cause the at least one display device to display the selections after a designated triggering event occurs in association with the game.

52. The gaming device of claim 51, wherein the at least one input device is a touch screen and wherein the instructions, when executed by the at least one processor, cause the at least one processor to: (i) enable the player to pick one of the selections with the touch screen to obtain the number of picks associated with the picked selection, and (ii) display the obtained number of picks.

53. The gaming device of claim 37, wherein each of the selections includes one of the different numbers of picks of the symbols.

54. The gaming device of claim 37, wherein the instructions, when executed by the at least one processor, cause the at least one processor to reset the number of picks of the symbols associated with the selections after each pick of the selections by the player.

55. The gaming device of claim 37, wherein the instructions, when executed by the at least one processor, cause the at least one processor to reset the number of picks of the symbols associated with the selections after a plurality of picks of the selections by the player.

56. The gaming device of claim 37, wherein a plurality of the selections include a plurality of terminators.

57. The, gaming device of claim 37, wherein a plurality of the symbols include a plurality of terminators.

58. A method of operating a gaming device having a plurality of instructions, the method comprising:

(a) causing at least one display device to display each of a quantity of randomly pickable symbols to a player in a play of a game, the quantity being at least three, wherein:

(i) each one of the symbols has a probability of being randomly picked, at least two of the randomly pickable symbols having different probabilities of being randomly picked, and (ii) for each randomly pickable symbol, the probability of being randomly picked is based on a number of times that symbol occurs in the game, at least two of the randomly pickable symbols occurring a plurality of times in the play of the game;

(b) before any of the symbols are randomly picked:

(i) causing at least one processor to execute the plurality of instructions to determine a number of picks of the symbols, wherein the determined number of picks is less than the quantity of the symbols, and (ii) causing the at least one display device to display the determined number of picks of the symbols; and (c) thereafter, for each sequential pick of the displayed determined number of picks of the displayed symbols:

(i) causing the at least one processor to execute the plurality of instructions to randomly pick at least one of the displayed symbols based on the probabilities;

(ii) causing the at least one display device to indicate any award associated with each randomly picked symbol; and (iii) if a designated number of symbols have been randomly picked, said designated number being at least one and less than the displayed determined number of picks:

(1)causing the at least one processor to execute the plurality of instructions to eliminate each and every occurrence of the randomly picked symbol from subsequent random picking of the unpicked displayed symbols remaining in the play of the game; and (2) for at least one subsequent random pick of the displayed symbols, causing the at least one processor to execute the plurality of instructions to proportionately increase the probabilities associated with the unpicked symbols remaining in the play of the game based on the probability associated with the randomly picked symbol.

59. The method of claim 58, which includes predetermining the number of picks of the symbols.

60. The method of claim 58, which includes randomly determining the number of picks of the symbols.

61. The method of claim 58, which includes causing the at least one display device to display a plurality of selections, each of said selections including at least one pick of the symbols, at least two of the selections including different numbers of picks of the symbols, and enabling the player to pick at least one of the selections to determine the number of picks of the symbols, wherein the determined number of picks of the symbols associated with the picked selection corresponds to the displayed determined number of picks of the symbols.

62. The method of claim 58, wherein a first group of the symbols includes a first probability of being picked and a second group of the symbols includes a second, different probability of being picked.

63. The method of claim 58, wherein a plurality of the symbols include different probabilities.

64. The method of claim 58, wherein all of the symbols include different probabilities.

65. The method of claim 58, wherein the designated number of symbols is one and which includes proportionately increasing the probabilities associated with the unpicked symbols after each random pick.

66. The method of claim 58, wherein the designated number of symbols is at least two and which includes proportionately increasing the probabilities associated with the unpicked symbols after at least two sequential random picks.

67. The method of claim 66, which includes causing the at least one processor to execute the plurality of instructions to randomly pick at least one of the symbols multiple times before eliminating each and every occurrence of said at least one symbol randomly picked multiple times.

68. The method of claim 58, wherein at least one symbol includes one relatively large award and the remaining symbols include a plurality of relatively small awards.

69. The method of claim 68, wherein the probability associated with the symbol including the relatively large award is less than at least one of the probabilities associated with the symbols including the relatively small awards.

70. The method of claim 68, wherein the probability associated with the symbol including the relatively large award is less than a plurality of the probabilities associated with the symbols including the relatively small awards.

71. The method of claim 68, wherein the probability associated with the symbol including the relatively large award is less than all of the probabilities associated with the symbols including the relatively small awards.

72. The method of claim 58, which includes providing (a) to (c) through a data network.

73. The method of claim 72, wherein the data network is an internet.

74. A method of operating a gaming device having a plurality of instructions, the method comprising:

(a) causing at least one display device to display each of a quantity of randomly pickable symbols to a player in a play of a game, the quantity being at least three, wherein:

(i) each of the randomly pickable symbols has a probability of being randomly picked, at least two of the randomly pickable symbols having different probabilities of being randomly picked, (ii) for each randomly pickable symbol, the probability of being randomly picked is based on a number of times that symbol occurs in the game, at least two of the randomly pickable symbols occurring a plurality of times in the play of the game, and (iii) at least one of the randomly pickable symbols includes a terminator;

(b) causing the at least one display device to display a number of picks of the symbols; and (c)

(i) thereafter, for each sequential pick of the displayed number of picks of the displayed symbols: causing at least one processor to execute the plurality of instructions to randomly pick at least one of the displayed symbols based on the probabilities;

(ii) causing the at least one processor to execute the plurality of instructions to terminate the number of picks of the symbols when the randomly picked symbol includes a terminator;

(iii) causing the at least one display device to indicate any award associated with each randomly picked symbol not including the terminator; and (iv) if a designated number of symbols have been randomly picked, said designated number being at least one and less than the displayed number of picks:

(1) causing the at least one processor to execute the plurality of instructions to eliminate each and every occurrence of the randomly picked symbol from subsequent random picking of the unpicked displayed symbols remaining in the play of the game; and (2) for at least one subsequent random pick of the displayed symbols, causing the at least one processor to execute the plurality of instructions to proportionately increase the probabilities associated with the unpicked symbols remaining in the play of the game based on the probability associated with the randomly picked symbol.

75. The method of claim 74, which includes determining the number of picks of the symbols prior to the random picking one of the symbols, wherein the number of picks is less than the quantity of the symbols.

76. The method of claim 74, wherein the probability associated with the terminator is greater than at least one of the probabilities associated with the remaining symbols.

77. The method of claim 74, wherein the probability associated with the terminator is greater than a plurality of the probabilities associated with the remaining symbols.

78. The method of claim 74, wherein the probability associated with the terminator is greater than all of the probabilities associated with the remaining symbols.

79. The method of claim 74, which includes providing (a) to (c) through a data network.

80. The method of claim 79, wherein the data network is an internet.

81. A method of operating a gaming device having a plurality of instructions, the method comprising:

(a) causing at least one display device to display each of a quantity of randomly pickable symbols and a plurality of selections to a player in a play of a game, the quantity being at least three, wherein:

(i) at least one of the selections includes a number of picks of the symbols, and at least two of the selections include different numbers of picks, (ii) at least one of the selections includes a terminator, (iii) each one of the symbols has a probability of being randomly picked, at least two of the randomly pickable symbols have different probabilities of being randomly picked, and (iv) for each randomly pickable symbol, the probability of being randomly picked is based on a number of times that symbol occurs in the play of the game, at least two of the randomly pickable symbols occurring a plurality of times in the play of the game;

(b) before any of the symbols are randomly picked, causing at least one processor to execute the plurality of instructions to receive an input from the player, the received input corresponding to a pick of one of the displayed selections;

(c) causing the at least one processor to execute the plurality of instructions to terminate the play of the game when the picked selection includes the terminator;

(d) causing the at least one display device to display the number of picks associated with the picked selection when the picked selection does not include the terminator; and (e) thereafter, for each sequential pick of the displayed number of picks of the displayed symbols:

(i) causing the at least one processor to execute the plurality of instructions to randomly pick at least one of the displayed symbols based on the probabilities;

(ii) causing the at least one display device to indicate any award associated with each randomly picked symbol; and (iii) if a designated number of symbols have been randomly picked, said designated number being at least one and less than the displayed number of picks:

(1) causing the at least one processor to execute the plurality of instructions to eliminate each and every occurrence of the randomly picked symbol from subsequent random picks of the unpicked displayed symbols remaining in the play of the game; and (2) for at least one subsequent random pick of the displayed symbols, causing the at least one processor to execute the plurality of instructions to proportionately increase the probabilities associated with the unpicked symbols remaining in the play of the game based on the probability associated with the randomly picked symbol.

82. The method of claim 81, wherein a first group of the symbols includes a first probability of being picked and a second group of the symbols includes a second, different probability of being picked.

83. The method of claim 81, wherein a plurality of the symbols include different probabilities.

84. The method of claim 81, wherein all of the symbols include different probabilities.

85. The method of claim 81, which includes resetting the selections after each pick of the selections by the player.

86. The method of claim 81, which includes resetting the selections after a plurality of picks of the selections by the player.

87. The method of claim 81, which includes reducing the total amount of the awards in the game when the player picks a selection including a terminator.

88. The method of claim 87, wherein the total amount of the awards is reduced by a predetermined amount.

89. The method of claim 88, wherein the predetermined amount is approximately 50% of the total amount of the awards in the game.

90. The method of claim 87, wherein the total amount of the awards is reduced by a randomly determined amount.

91. The method of claim 87, which includes providing the player with a consolation award when the player picks one of the selections including a terminator.

92. The method of claim 87, which includes providing (a) to (e) through a data network.

93. The method of claim 92, wherein the data network is an internet.

* * * * *

UNITED STATES PATENT AND TRADEMARK OFFICE

CERTIFICATE OF CORRECTION

PATENT NO. : 7,674,168 B2
APPLICATION NO. : 10/236660
DATED : March 9, 2010
INVENTOR(S) : Gerrard et al.

It is certified that error appears in the above-identified patent and that said Letters Patent is hereby corrected as shown below:

IN THE CLAIMS:

In Claim 7, Column 16, line 20, replace "an" with --and--.

In Claim 29, Column 17, line 63, insert --(i)-- before "determine".

In Claim 74, Column 22, line 11, insert --and-- after "picked,".

In Claim 74, Column 22, line 21, delete "(c)".

In Claim 74, Column 22, line 22, replace "(i)" with --(c)--.

In Claim 74, Column 22, line 23, insert --(i)-- before "causing".

Signed and Sealed this

Thirteenth Day of July, 2010

David J. Kappos
*Director of the United States Patent and Trademark Office*